United States Patent
Naccache et al.

(10) Patent No.: US 7,433,501 B2
(45) Date of Patent: Oct. 7, 2008

(54) BIOMETRIC IDENTIFICATION METHOD AND DEVICE ADAPTED TO VERIFICATION ON CHIP CARDS

(75) Inventors: David Naccache, Paris (FR); Claude Barral, St Savournin (FR); Jean-Sebastien Coron, Asnieres-sur-Seine (FR); Cédric Cardonnel, Carnoux en Provence (FR)

(73) Assignee: Gemplus, Gemenos (FR)

( * ) Notice: Subject to any disclaimer, the term of this patent is extended or adjusted under 35 U.S.C. 154(b) by 697 days.

(21) Appl. No.: 10/859,978

(22) Filed: Jun. 4, 2004

(65) Prior Publication Data

US 2005/0011946 A1 Jan. 20, 2005

(30) Foreign Application Priority Data

Jun. 5, 2003 (FR) .................................. 03 06789

(51) Int. Cl.
*G06K 9/00* (2006.01)
(52) U.S. Cl. ........................................ 382/124; 382/125
(58) Field of Classification Search ................. 381/112; 382/124, 125, 181, 182, 229, 309; 704/251
See application file for complete search history.

(56) References Cited

U.S. PATENT DOCUMENTS 6,185,316 B1 * 2/2001 Buffam ....................... 382/115

FOREIGN PATENT DOCUMENTS

| EP | 0 493 243 A1 | | 7/1992 |
| FR | 0493243 | * | 7/1992 |
| WO | 2004/109585 A1 | | 12/2004 |

OTHER PUBLICATIONS

Boller R M et al: "Biometric perils and patches" Pattern Recognition, Dec. 12, 2002, pp. 2727-2738, vol. 35, No. 12, Pergamon Press Inc., Elmsford, NY, US.
Soutar C et al: "Biometric Encryption using image processing" Proceedings of the SPIE, Jan. 28, 1998, pp. 178-188, No. 3314, SPIE, Bellingham, VA, US.

* cited by examiner

*Primary Examiner*—Matthew C. Bella
*Assistant Examiner*—Gregory F Cunningham
(74) *Attorney, Agent, or Firm*—Buchanan Ingersoll & Rooney PC

(57) ABSTRACT

A method and associated device for checking a biometric signature by a simple and secure calculation adapted to personal objects of the chip card type. The method is based on the storage within the object of an obscured biometric signature and an associated authentication code. A terminal capturing a fingerprint compares the fingerprint data with the obscured biometric signature transmitted by the card and transfers the result of this comparison to the chip card, which validates this result with the authentication code.

17 Claims, 2 Drawing Sheets

Fig. 1a
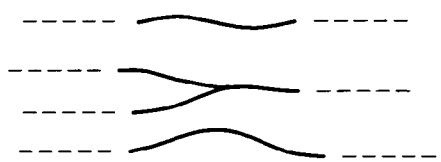
Fig. 1b
Fig. 2a1
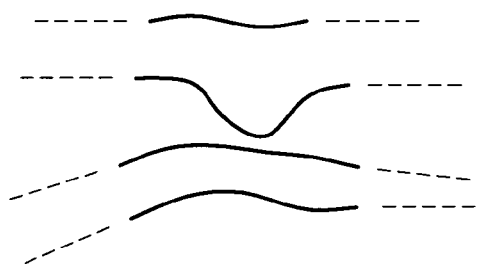
Fig. 2b1
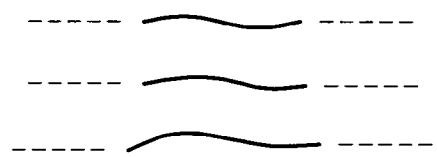
Fig. 2a2
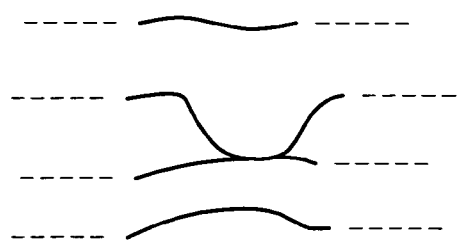
Fig. 2b2
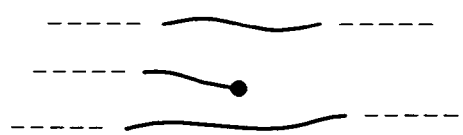

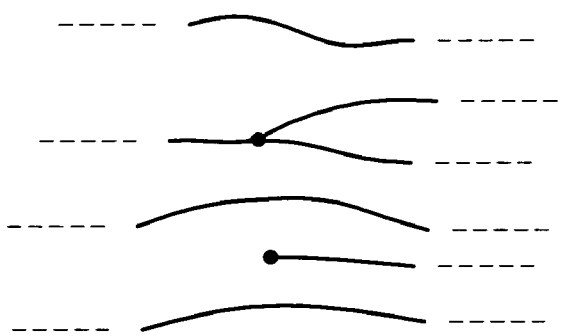
Fig. 3a
Fig. 3b
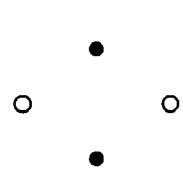
Fig. 3c
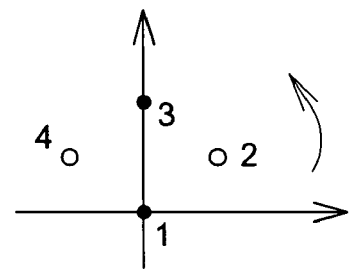
Fig. 3d
1010
Fig. 3e

BIOMETRIC IDENTIFICATION METHOD AND DEVICE ADAPTED TO VERIFICATION ON CHIP CARDS

This disclosure is based upon French Application No. 03/06789, filed Jun. 5, 2003, the contents of which are incorporated herein by reference.

BACKGROUND OF THE INVENTION

The invention concerns the biometric identification of a user of a system. It is adapted to an identity check on a portable object of the chip card type, e.g. so-called smart cards.

One method normally used for identifying a user is based on a secret identification code, also referred to as a PIN (Personal Identification Number). In a system using chip cards, a user enters his PIN code on a transaction terminal, which then transfers the entered PIN code to the chip card, which checks the PIN code by comparison with a reference PIN code. The security of such a system is guaranteed by the fact that the reference PIN code is stored within the chip card, which is inherently protected, and never leaves it during the identity check process, since the final check is made by the card. The drawbacks of such a system are the fact that the owner of the card must memorize a secret and the fact that another user can commit fraud by stealing this secret.

Biometrics consists of acquiring, measuring and recognizing physical characteristics of a user. It makes it possible to directly identify a user whilst the PIN code method allows indirect identification by the fact of checking that the user knows a secret. Amongst the known techniques in biometrics, there are the methods of recognizing voice characteristics, characteristics peculiar to the shape of the face or to the iris of the eye or, in the most frequent case, fingerprint characteristics.

All the existing biometric identity check systems are broken down into three phases:
  the first phase is a phase of capturing biometric data from a sensor. The obtained biometric data are usually images, for example in the case of fingerprints, iris or face shape. However, it can also be a case of sound sequences in the case of voice recognition.
  The second phase is an analysis or extraction phase for extracting a biometric signature from biometric data captured during the first phase, this signature being composed of a more restricted set of particular biometric data. This second phase is extremely complex and requires high calculation power.
  The third phase consists of comparing the biometric signature obtained during the second phase with a reference signature defined previously during a procedure called enrolling.

Portable electronic objects of the chip card type are provided with microprocessors whose calculation power is still limited. This is why a biometric system of the prior art using chip cards functions as follows:
  in the enrolling phase, a reference biometric signature of the user of the card is stored in a secure memory of the chip card.
  in the identity check phase, a terminal captures the biometric data of the user and then extracts a biometric signature. Two solutions then exist:
  either the reference biometric signature is transferred from the card to the terminal for a check on the identity, by comparing the two signatures, on the terminal: this method has the drawback that the reference signature may be intercepted, which is a security failing. A conventional identification by PIN code does not have this drawback;
  or the extracted biometric signature is transferred to the card for a check on the card. The card having only a low calculation capacity, the check is a complex operation, which requires a long processing time. This represents a drawback compared with the conventional use of a PIN code.

SUMMARY OF THE INVENTION

One object of the present invention is to propose a biometric identification solution which is both secure and simple, adapted to an identity check on an object of the chip card type.

The solution is based on an enrolment method comprising the capture of biometric data, the extraction of a true biometric signature composed of true particular biometric data, characterised in that it comprises the following steps:
  producing false particular biometric data,
  generating the obscured biometric signature by combining the false particular biometric data with the particular true biometric data,
  producing an authentication code which indicates which are the false and true particular biometric data of the obscured biometric signature.

The false particular biometric data can be produced consistently with the true particular biometric data. For this, at least one false particular biometric data item can be produced by slightly transforming a true biometric data item;
  in the case of minutiae which correspond to fingerprint data of a first finger, at least one false minutiae can be produced from minutiae of a second finger;
  a false particular biometric data item can also be produced by detecting a true biometric data item having a geometry relatively close to a true particular biometric data item and transforming this true biometric data item in order to create the false particular biometric data item.

The authentication code can be established according to the following steps:
  the particular biometric data of the obscured biometric signature are ordered;
  the authentication code is composed of a series of bits, with a length equal to the total number of true and false particular biometric data of the obscured biometric signature, each bit indicating respectively whether the corresponding particular biometric data item is true or false.

The obscured biometric signature and the authentication code can be recorded in a secure memory of a personal object of the chip card type.

The solution also proposes a biometric identity check method comprising the capture of biometric data and the extraction of a true biometric signature composed of true particular biometric data, and comprising the following steps:
  comparing the true biometric signature with an obscured biometric signature,
  producing a code indicating the true and false biometric data on the basis of the previous comparison with the true biometric signature,
  comparing this code with an authentication code indicating the true and false particular biometric data of the obscured biometric signature.

In this method, the authentication code can be stored in a secure memory of a personal object and the comparison of the code and authentication code can take place within the personal object.

The biometric identity check method for accessing a service by means of a service terminal, based on a personal object of the chip card type for storing the authentication code and the obscured biometric signature, can comprise the following steps:

transferring the obscured biometric signature from the personal object to the service terminal for the comparison of the true biometric signature with the obscured biometric signature and producing the code within the service terminal;

transferring the code from the service terminal to the personal object for comparison of the code with the authentication code on the personal object.

The invention is also based on an enrolment device using biometric signature extraction software in order to obtain a true biometric signature composed of true particular biometric data from captured biometric data, using obscuring software consisting firstly of producing false particular biometric data and combining them with the true particular biometric data in order to obtain an obscured biometric signature, and secondly producing an authentication code for indicating the true and false particular biometric data of the obscured biometric signature.

The enrolment device can comprise a device for communication with a personal object of the chip card type suitable for transferring the obscured biometric signature and the authentication code to the personal object.

The invention also proposes a personal object comprising a secure memory and a communication means and comprising in its secure memory an obscured biometric signature and an authentication code and comprising a means of comparing a code transferred by the communication means with the authentication code. This personal object may be a medium with a chip of the chip card type.

The invention also proposes a service terminal using extraction software in order to obtain a true biometric signature composed of true particular biometric data from captured biometric data and using software for producing a code from a comparison between the true biometric signature and an obscured biometric signature, the code indicating the true and false biometric data on the basis of the true biometric signature calculated by the service terminal.

This service terminal can comprise a communication device for communicating with a personal object of the chip card type, able to transfer the obscured biometric signature from the personal object and the code produced to the personal object.

BRIEF DESCRIPTION OF THE DRAWINGS

Other characteristics and advantages of the present invention will emerge from a reading of the following description of particular exemplary embodiments, given for illustrative purposes in a non-limiting manner, and the accompanying drawings in which:

FIGS. 1*a*-1*b* depict examples of minutiae of fingerprints;

FIGS. 2*a*1 -2*b*2 depict examples of the creation of false minutiae; and

FIGS. 3*a*-3*e* depict a simplified example of the creation of an obscured signature and of the authentication code according to the invention.

DETAILED DESCRIPTION

One embodiment of the invention will be described in the context of an identification by fingerprint in a banking application. In this example, reference is made to the use of a chip card, e.g. a smart card, as a personal object with which the invention is implemented. It will be appreciated that the invention is not limited to cards. Rather, the chip card is representative of any type of portable electronic object that contains a microprocessor and memory and is typically associated with personal use by one person.

A user is provided with a chip card possessing a secure memory and a biometric identity check function which will be detailed below.

During the enrolment phase, which consists of storing the reference biometric signature on the card, the user goes to a secure place such as a bank branch for example, where his fingerprint is captured on a special terminal. An extraction algorithm of the prior art, whose principle consists of selecting particular biometric data from the captured fingerprint, referred to as minutiae, derives therefrom the biometric signature composed of these minutiae. To facilitate understanding of the remainder of the description, the terms true minutiae and true biometric signature will be used for these data obtained according to the calculation of the prior art. These true minutiae are, for example, identified by data indicating their position, plus a data item indicating their type. FIG. 1 shows two examples of types of minutiae, a line bifurcation (FIG. 1*a*) and a line end (FIG. 1*b*). The number of minutiae to be selected by the extraction algorithm is predefined in order to obtain a good compromise between security and calculation complexity.

According to the method of the invention, before the recording of the signature on the chip card, the enrolment terminal uses obscuring software in order to transform the previous true biometric signature. This obscuring software uses an obscuring method which consists of combining the true minutiae previously extracted and making up the true biometric signature with false data which will be referred to as false minutiae, so as to obtain an obscured biometric signature.

One characteristic of the obscuring method consists of defining false minutiae which are consistent with the true minutiae in order to make the operation consisting of finding the true biometric signature from the obscured signature difficult or impossible. For this, it is possible to use the following methods:

according to a first variant, the sensor of the bank terminal captures more minutiae than the predefined number. The additional minutiae are then slightly transformed in order to obtain false minutiae. This transformation can consist of a modification of the coordinates of the minutiae by a rotation or translation, or a modification of their type;

according to a second variant close to the previous one, it is possible to obtain the false minutiae by transforming minutiae obtained during the capture of the print from another finger. It will then be arranged to keep only false minutiae not too close to the true minutiae selected in order to preserve consistency of the whole. The advantage of this variant is that it is applicable in cases where the number of minutiae of a single print is small;

according to a third variant, amongst the captured biometric data, relatively close geometries of true minutiae are detected and are transformed in order to create false minutiae consistent with the global geometry of the fingerprint. This transformation is illustrated in FIG. 2. FIG. 2*a*1 depicts a true geometry which is transformed into a false minutiae of the bifurcation type depicted in FIG. 2*a*2. FIG. 2*b*1 depicts a true geometry which is transformed into a false minutiae of the line end type depicted in FIG. 2*b*2.

Combining the false and true minutiae makes it possible to obtain the obscured biometric signature. At the same time, the obscuring method generates an authentication code whose content indicates the minutiae which are true and false in the obscured signature. In order to produce this authentication code, the minutiae are first of all ordered in a well defined order, by choosing for example a geometric origin and then classifying the minutiae according to their position with respect to this origin. Then the authentication code is established in the form of a list of zeros and ones, the zeros indicating that a minutiae is false and the ones that the minutiae are true, or vice-versa. This authentication code therefore has as its dimension a number of bits equal to the total number of minutiae of the obscured signature. FIG. 3 illustrates a simplified example of the production of an obscured signature and of the associated authentication code. FIG. 3a depicts a fingerprint, FIG. 3b depicts the two true minutiae (represented by a solid circle) extracted from the fingerprint by the extraction algorithm, FIG. 3c depicts the obscured signature, which was produced by adding two false minutiae (represented by an empty circle), FIG. 3d depicts the same minutiae ordered and FIG. 3e depicts the associated authentication code.

The enrolment phase ends with the storage of the obscured biometric signature and the authentication code in the non-volatile memory (EEPROM, FLASH, etc.) of the chip card. These data require a relatively small amount of memory space of a few tens of bytes.

After the enrolment, the bank card can be used to make payments, access banking services etc. Each operation requires a phase of checking the identity of the user, which comprises the following steps:

the service terminal, for example a cash dispenser, captures the fingerprint of the user;

the terminal calculates the true biometric signature from this fingerprint by means of the same extraction algorithm as that used during the enrolment phase;

the card transfers the obscured biometric signature to the terminal. It should be noted that this method has the advantage, unlike the prior art, of not transferring the true reference biometric signature;

the terminal compares the true biometric signature with the obscured biometric signature transferred by the card and derives therefrom a code representing the differences between the two signatures, according to a calculation similar to that of the production of the authentication code described during the enrolment phase. This code represents the true and false minutiae on the basis of the true biometric signature derived from the captured fingerprint. This code must be almost identical to the authentication code if the user is indeed the correct person;

the code obtained is transferred from the terminal to the chip card;

the chip card comprises a means, in software or hardware form, which makes it possible to compare (for example by means of an XOR function) the code received and the authentication code, stored in the memory during the enrolment phase. If the codes are sufficiently identical with respect to the predefined tolerance, then the card returns to the terminal a positive message validating the identity of the user.

A first advantage of this method is its flexibility: it is possible to choose a number of true and false minutiae according to the security requirements and processing time required. One of the most simple implementations with the use of 10 true and 10 false minutiae, and with a tolerance consisting of accepting the error of one minutiae in the checking calculation, gives rise to a rate of false acceptance of 1 in 10,000 and a processing time by the card of the same order as the checking of a PIN code.

This method also has the same advantages of the system of the prior art based on PIN codes since firstly there is no longer any transfer of confidential information from the card to the terminal and since moreover the checking calculation implemented within the card is very simple. It should be noted that the authentication code fulfils a role similar to the PIN code of the solutions of identification by PIN code as described previously. Moreover, this method of course includes the advantages of biometrics. The invention therefore makes it possible to combine the advantages of biometrics and PIN code.

The invention, as described in this embodiment, is implemented by means of various devices comprising the following particular functionalities:

obscuring software based on a method of producing false minutiae, combining false and true minutiae in order to produce an obscured biometric signature and an authentication code, implemented during an enrolment phase on a secure terminal of a service provider such as a bank;

software for comparing an extracted biometric signature with an obscured biometric signature, generating a code, used on a service terminal during an identity check phase;

a code check means used on the card which also possesses a secure memory for containing an authentication code and a reference obscured biometric signature.

The methods of the invention are of course adapted to other fields of biometrics, using similar mechanisms based on particular biometric data, fulfilling the role of fingerprint minutiae. False particular biometric data consistent with the true particular biometric data will also be added.

In addition, the invention is particularly well adapted to the systems based on personal objects such as chip cards, possessing few hardware resources. It does however remain applicable to other systems not necessarily using such an object.

The invention claimed is:

1. An enrolment method comprising the steps of:
capturing biometric data;
extracting a true biometric signature composed of true particular biometric data from the captured biometric data;
producing false particular biometric data;
generating an obscured biometric signature by combining the false particular biometric data with the true particular biometric data; and
producing an authentication code which indicates which data are the false and true particular biometric data of the obscured biometric signature.

2. An enrolment method according to claim 1, wherein the false particular biometric data are produced in a manner consistent with the true particular biometric data.

3. An enrolment method according to claim 2, wherein at least one false particular biometric data item is produced by transforming a true biometric data item.

4. An enrolment method according to claim 3, wherein the true particular biometric data are minutiae which correspond to fingerprint data of a first finger and said at least one false minutiae is produced from minutiae of a second finger.

5. An enrolment method according to claim 3, wherein at least one false particular biometric data item is produced by detecting a true biometric data item and transforming the true biometric data item in order to create the false particular biometric data item.

6. An enrolment method according to claim 1, wherein the authentication code is established according to the following steps:
- ordering the true and false particular biometric data of the obscured biometric signature; and
- generating a series of bits, with a length equal to the total number of true and false particular biometric data of the obscured biometric signature, with each bit indicating respectively whether a corresponding ordered particular biometric data item is true or false.

7. An enrolment method according to claim 1, wherein the biometric data are those of a fingerprint and the particular biometric data are minutiae.

8. An enrolment method according to claim 1, wherein the obscured biometric signature and the authentication code are recorded on a secure memory of a chip card.

9. A biometric identity check method comprising the steps of:
- capturing biometric data;
- extracting a true biometric signature composed of true particular biometric data from the captured biometric data;
- comparing the true biometric signature with an obscured biometric signature composed of true particular biometric data and false particular biometric data;
- producing a code indicating which data of the obscured biometric signature are the true and false biometric data on the basis of the comparison with the true biometric signature; and
- comparing said produced code with an authentication code indicating which data are the true and false particular biometric data of the obscured biometric signature.

10. A biometric identity check method according to claim 9, wherein the authentication code is stored in a secure memory of a personal object and the comparison of the produced code and authentication code takes place within the personal object.

11. A biometric identity check method according to claim 10 for accessing a service by means of a service terminal, based on a chip card storing the authentication code and the obscured biometric signature, comprising the following steps:
- transferring the obscured biometric signature from the chip card to the service terminal for the comparison of the true biometric signature with the obscured biometric signature and producing the code within the service term; and
- transferring the produced code from the service terminal to the chip card for comparison of the code with the authentication code on the chip card.

12. An enrolment device, comprising: biometric signature extraction means for obtaining a true biometric signature composed of true particular biometric data from captured biometric data; and
- obscuring means for producing false particular biometric data, combining said false particular biometric data with said true particular biometric data to obtain an obscured biometric signature, and producing an authentication code for indicating which data are the true and false particular biometric data of the obscured biometric signature.

13. An enrolment device according to claim 12, further comprising a device for communicating with a chip card to transfer the obscured biometric signature and the authentication code to the chip card.

14. A personal object comprising:
- a secure memory that contains an obscured biometric signature composed of true particular biometric data and false particular biometric data and an authentication code that indicates which data are the true and false particular biometric data of the obscured biometric signature;
- communication means to transfer the obscured biometric signature to a service terminal; and
- a means for comparing a code, produced by the service terminal and transferred by the communication means to the personal object, with the authentication code, wherein the produced code indicates which data are the true and false particular biometric data of the obscured biometric signature on the basis of a true biometric signature obtained by the service terminal.

15. A personal object according to claim 14, wherein said object is a chip card.

16. A service terminal comprising:
- extraction means for obtaining a true biometric signature composed of true particular biometric data from captured biometric data; and
- means for producing a code from a comparison between the true biometric signature and an obscured biometric signature composed of true particular biometric data and false particular biometric data, said produced code indicating which data are the true and false biometric data of the obscured biometric signature on the basis of the true biometric signature obtained by the service terminal.

17. A service terminal according to claim 16, further comprising a communication device for communicating with a personal object to transfer the obscured biometric signature from the personal object to the service terminal and to transfer the produced code to the personal object.

* * * * *